(12) United States Patent
Gen

(10) Patent No.: US 6,949,254 B2
(45) Date of Patent: Sep. 27, 2005

(54) BIO-DECOMPOSABLE POLYMER COMPOSITION SHOWING GOOD THERMAL DECOMPOSITION

(75) Inventor: Shokyu Gen, Kyoto (JP)

(73) Assignee: BMG Incorporated, Kyoto (JP)

(*) Notice: Subject to any disclaimer, the term of this patent is extended or adjusted under 35 U.S.C. 154(b) by 197 days.

(21) Appl. No.: 10/060,588

(22) Filed: Jan. 30, 2002

(65) Prior Publication Data

US 2003/0143256 A1 Jul. 31, 2003

(51) Int. Cl.$^7$ .................................................. A61F 2/02
(52) U.S. Cl. ...................................................... 424/426
(58) Field of Search ........................ 424/426; 514/772.3

(56) References Cited

U.S. PATENT DOCUMENTS 5,733,868 A * 3/1998 Peterson et al. ............... 514/2

FOREIGN PATENT DOCUMENTS

JP 2002114921 * 4/2002

* cited by examiner

Primary Examiner—Carlos A. Azpuru
(74) Attorney, Agent, or Firm—Jordan and Hamburg LLP

(57) ABSTRACT

A biodegradable polymer composition having good resistance to thermal decomposition, wherein it is possible to control the weight-average molecular weight to within 30% of the initial molecular weight after molding and radiation sterilization, by adding a free radical scavenger to the biodegradable polymer.

Biodegradable polymer compositions of the invention, which withstand thermal and radiation decomposition are effective for medical and many industrial uses. Moreover, this inventive method is applicable for the treatment of many non-biodegradable polymers such as nylon or polypropylene which are subjected to thermal casting and radiation sterilization.

22 Claims, No Drawings

BIO-DECOMPOSABLE POLYMER COMPOSITION SHOWING GOOD THERMAL DECOMPOSITION

BACKGROUND OF THE INVENTION

1. Field of the Invention

This invention relates to a biodegradable polymer composition that exhibits good resistance to thermal decomposition, resulting from molding or radiation sterilization. It has been found that it is possible to control the reduction in weight-average molecular weight caused by thermal decomposition to within 30% of the initial molecular weight after molding and radiation sterilization, by adding a free radical scavenger to the biodegradable polymer.

In this invention, the biodegradable polymer has sufficiently mild properties so that it is suitable for medical treatment of parts of the body and their environment, while maintaining its shape and properties for a necessary period. After such treatment, the polymer may be caused to disappear by hydrolyzing with an enzyme or non-enzyme.

2. Description of the Related Art

The biodegradable polymer may be natural or synthetic, and an enzyme is capable of hydrolyzing almost all natural polymers. For example, collagen which is a polypeptide, is representative of the natural polymers and is hydrolyzed by collagenase, while a polyglycoside composed of combined glycosides such as cellulose, starch, hyaluromic acid, chitin and chitosan is also contemplated, with cellulose, for example being hydrolyzed by cellulase enzyme.

In spite of the fact that a natural polyester produced by a microbe was known as a biodegradable polymer since 1920, such knowledge was not utilized for a long time. However, as a result of recent progress in biotechnology, many kinds of natural polyesters have been researched and developed as biodegradable materials, including poly β-hydroxybutylate.

Many kinds of synthetic biodegradable polymers are capable of being hydrolyzed by a non-enzyme. However, polypeptides such as poly glutamic acid are hydrolyzed by peptide decomposition enzymes similar to natural polypeptides.

Almost all biodegradable synthetic polyesters such as polyglucolic acid, polylactic acid or copolymers of glycolic and lactic acids, are hydrolyzed by non-enzymes and find frequent clinical use as medical materials.

There are many medical applications of biodegradable polymers employed as medical materials, but these are almost always restricted to surgical use such as suture or bone fixation materials. Other industrial uses of these polymers include PLLA film molded products such as a garbage bags, agricultural film, storage bags, or textiles, since PLLA is decomposed by microbes under a natural environment.

The production of biodegradable polymers useful as medical and industrial materials is accomplished by such methods as extrusion of heated meltdown, injection, and pressed molding. However, heating processes are usually avoided in the course of production, since a drop in molecular weight inevitably occurs in products after such heating process, because biodegradable polymers generally have poor heat stability. In addition, sterilization is inevitably necessary for medical use in contrast with industrial use, because biodegradable polymers are applied in surgical use such as surgical sutures or bone fixation materials. Ethylene-oxide gas is generally utilized for the sterilization process, because biodegradable polymers show poor durability against radiation exposure. In this process, since ethylene-oxide gas utilized for the sterilization, is intended to eliminate toxicity in the living body, it is inevitably necessary to remove residual gas after the sterilization process, by applying vacuum for an extended period, but it is nevertheless impossible to completely remove the gas. Sterilization methods by radiation are therefore employed in many cases when biodegradable polymers are utilized for medical uses. Moreover, only specified kinds of biodegradable polymers are generally irradiated, but some strength deterioration inevitably occurs, caused by radiation decomposition.

It is the object of this invention to treat biodegradable polymers so as to avoid or restrict molecular weight reduction in the course of heat treatment processes, and strength deterioration, caused by sterilization, and to improve the properties of the composition containing the treated polymer.

SUMMARY OF THE INVENTION

In this invention, the production of a biodegradable polymer composition showing good resistance to thermal decomposition, wherein a drop of weight-average molecular weight is controlled within 30% of the initial molecular weight after molding and radiation sterilization process, is accomplished by adding a free radical scavenger to the biodegradable polymer.

Biodegradable polymer compositions of the invention, notwithstanding thermal and radiation decomposition, are applicable for medical and many industrial uses. Moreover, this processing method may be applied to non-biodegradable polymers such as nylon or polypropylene when subjected to thermal casting and sterilization by irradiation.

DETAILED DESCRIPTION OF THE INVENTION

For treatment of the biodegradable polymer compositions of the invention, the free radical scavenger is selected from the oxidation resistant agent group consisting of polyphenols, tannic acids, or gallic acids, the vitamin group consisting of Vitamin E or Vitamin C, or triarylisocianulate, such free radical scavenger being added to the biodegradable polymer composition, to improve its properties after thermal, mechanical and irradiation treatments.

When the biodegradable polymer is heated until its temperature is 50-degrees Centigrade higher than its melting temperature, radicals are generated from the polymer. Moreover, the polymer begins to deteriorate by an oxidizing reaction caused by ambient oxygen. The molecular weight of the polymer is substantially reduced by a high dose (of 2 to 3 MRad) applied radiation similar in effect to heating, generating radicals in molecular chains of the polymer, causing breaks in the chains and substantially reducing the molecular weight.

In order to prevent the molecular chains from being broken by the generated radicals as a result of heating and irradiation, the free radical scavenger can be previously added to the polymer composition in order to inactivate the generated radicals.

The volume of the free radical scavenger added to the composition is preferably in the range of 0.01 to 10 wt. %, more preferably a range of 0.01 to 2 wt. %, based on the weight of the polymer. If the volume of scavenger is less than 0.01 wt. %, the time necessary to obtain desired results will be undesirably long. If volume is more than 10 wt. %, the added scavenger may have a negative rather a positive effect on the molecular weight of the polymer.

There is no special method or process for adding and mixing free radical scavenger with the biodegradable polymer composition. For example, when adding vitamin E, it is possible not only to directly add the vitamin E to the polymer in the mentioned volume range, but also at first mix and dissolve the vitamin E in an organic solvent such as acetone, causing a mixture of the polymer and vitamin E to remain at final drying of the resulting solution.

In order to obtain additional uniform mixture, the biodegradable polymer composition may be absorbed to form a complex with an inorganic compound such as apatite, zeolite or titanium dioxide.

Operations involving the application of heat including extrusion, injection and heat pressing may be part of the manufacturing process for producing a biodegradable polymer composition by adding and mixing a free radical scavenger with the polymer. It is preferred that the composition is produced at a temperature not more than 50-degree Centigrade higher than the melting temperature of the biodegradable polymer, because such temperature is the upper limited temperature for generating free radicals. There is no restriction with respect to a lower limit of the temperature for generating free radicals, but it is preferred to produce such radicals at a higher temperature than the softening point of the biodegradable polymer because of greater ease of production.

The biodegradable polymer composition prepared by adding and mixing the free radical scavenger with the polymer is sterilized with radiation such as $^{60}$Co-γ ray by a conventional method. It is preferred that the radiation is produced in a dose range of 1.0 to 3.0 Mrad. If the radiation is less than 1.0 Mrad dose, the sterilization effect is poor, and if more than 3.0 Mrad dose, the molecular weight of the polymer begins to deteriorate.

There is no special procedure for carrying out the steps involving heating and radiation sterilization. However, it is preferred that the heating step is carried out first, because of greater ease of production.

The biodegradable polymer of this invention is composed of any of natural and synthetic polymers, and free radicals are generated during steps of heating and radiation sterilization. The polymer includes, for example any of the group consisting of poly-glycolic acid, poly-lactic acid, poly-dioxanon, gelatin, hyaluronic acid, collagen, poly-amino acid, poly-caprolacton, copolymer of lactic and glycolic acid, copolymer of lactic acid and caprolacton, copolymer of glycolic acid and caprolactone, poly-hydroxybutylate, chitin, albumin, or chitosan. The biodegradable polymer composition of the invention is applicable for medical and many industrial uses.

By this invention, the biodegradable polymer is prevented from an occurrence of molecular weight loss caused by heating and by radiation sterilization. This results in the production of high quality polymer compositions.

In conclusion, products of biodegradable polymer compositions produced by this invention such as sutures for operations and bone fixation material maintain their mechanical properties and have other improved properties due to the prevention of molecular weight loss caused by heating and radiation sterilization.

Other polymers which may be added to the biodegradable polymer, such as polyethylene for artificial joint friction parts, that require heating and radiation sterilization, can also be treated by this invented method, in order to prevent molecular weight loss from accelerating.

EXAMPLES

The following examples illustrate the invention, but do not restrict the scope of such invention as claimed herein.

The weight-average molecular weights shown in the examples are measured by Shimazu GPC.

Example 1

To poly-L-lactide(PLLA) having a weight-average molecular weight of 340 thousand was added 0.1 wt. % Vitamin E(Tocopherol). From this composition, a molded rod sample of 10 cm length and 10 mm diameter was formed using an injection machine (Nisshou Jushi Ind. Ltd., NS40-A).

While the weight-average molecular weight of the PLLA rod having no Vitamin E additive declined to about 180 thousand after molding, the weight-average molecular weight of PLLA rod having Vitamin E additive showed almost no molecular weight drop, at about a 330 thousand molecular weight.

Example 2

To PLLA having a weight-average molecular weight of about 280 thousand was added 1.0 wt. % of Vitamin E. Pellets of this composition were spun into thread using a simplified melt spinner. The molecular weight after spinning was about 260 thousand, indicating a small molecular weight drop.

In contrast, PLLA thread similarly spun but with no Vitamin E additive had a reduced molecular weight of about 140 thousand, about half the molecular weight of the Vitamin E-containing PLLA after spinning Example 3

PLLA pellets of weight-average molecular weight of about 280 thousand were modified by treated samples composed of 100 parts of titanium dioxide (WakoJunyaku Co.) and 10 parts of tannin (WakoJunyaku Co.) that was absorbed in the titanium dioxide. A PLLA rod was then fabricated from polymer pellets containing 0.5 parts of treated samples per tannin unit.

The molecular weight after molding the rod was about 260 thousand, indicating a relatively small molecular weight drop, while the molecular weight of the PLLA rod having no tannin additive declined to about 140 thousand.

Example 4

To a copolymer of L-lactide(75 mol %) and caprolactone (25 mol %) having a weight-average molecular weight of about 340 thousand was, added Vitamin E in the amount of 0.2 wt. % and the copolymer was used to spin thread with a simplified melt spinner. The weight-average molecular weight of the copolymer was about 330 thousand and indicated a small molecular weight drop from that of the copolymer containing no Vitamin E.

Example 5

The melt-spun thread of Example 4 was packed in a bag laminated with aluminum and polyethylene film, the air in the bag was replaced by nitrogen gas, and the thread was irradiated by exposure to radioactive rays ($^{60}$Co-γ ray) of 2.5 Mrad. The weight-average molecular weight of the thread after radiation was about 300 thousand.

Example 6

To PLLA pellets of weight-average molecular weight of about 280 thousand was added triarylisocianulate in an amount of 0.2 wt. %, and the composition was extruded to a rod of 2 mm diameter. The weight-average molecular weight of the extruded PLLA was slightly increased to 290 thousand.

The product was vacuum-packed and irradiated, by exposure to radioactive rays ($^{60}$Co-γ ray) of 2.0 Mrad, to obtain a cross-linked product having improved mechanical properties.

Example 7

A treated specimen was prepared composed of 100 parts hydroxy-apatite and 1 part Vitamin E absorbed in the hydroxy-apatite. A mixture composed of 100 parts of PLLA pellets of weight-average molecular weight of about 280 thousand was mixed with 30 parts of the treated specimen in apatite and molded by injector. The molecule weight of PLLA in the resulting composite was about 330 thousand. After forming the composite by means of a hydrostatic pressure type extruder in order to orientate the molecular chains, the composite was irradiated with $^{60}$Co-γ radiation of 2.5 MRad to obtain the finished PLLA/apatite composite which had a molecular weight of about 300 thousand and superior mechanical properities, for example, high tenacity and high modulus.

What we claim is:

1. A biodegradable polymer composition for molding by a method involving a melt of the composition, said composition comprising:
    a biodegradable polymer that is at least one selected from the group consisting of: polyglycolic acid, polylactic acid, polydioxanan, polycaprolactone, copolymer of lactic acid and glycolic acid, copolymer of lactic acid and caprolactone, copolymer of glycolic acid and caprolactone, and polyhydroxybutylate; and
    a free radical scavenger that is at least one selected from the group consisting of: polyphenols, tannic acids, gallic acids, vitamin E, and triarylisocianulate.

2. The biodegradable polymer composition according to claim 1, wherein a decrease in average molecular weight of said composition subsequent to subjecting said composition to at least one of said molding and radiation sterilization is not greater than 30% of an average molecular weight of said composition prior to said at least one of said molding and said radiation sterilization.

3. The biodegradable polymer composition according to claim 1, wherein a drop in average molecular weight of said composition subsequent to subjecting said composition to said molding and radiation sterilization is not greater than 30% of an average molecular weight of said composition prior to said molding and said radiation sterilization.

4. The biodegradable polymer composition according to claim 1, wherein said free radical scavenger is present in an amount from 0.1 to 10 wt. % by volume per 100 wt. % of polymer.

5. The biodegradable polymer composition according to claim 1, wherein said free radical scavenger is present in an amount from 0.01 to 2 wt. % by volume per 100 wt. % of polymer.

6. The biodegradable polymer composition according to claim 1, wherein said biodegradable polymer composition is formed as a complex with an inorganic compound.

7. The biodegradable polymer composition according to claim 6, wherein said inorganic compound is selected from the group consisting of: apatite, zeolite, and titanium oxide.

8. A method for producing a biodegradable polymer product comprising mixing a biodegradable polymer and a free radical scavenger to form a mixture and molding said mixture by a method involving a melt of the mixture,
    wherein said biodegradable polymer is at least one selected from the group consisting of: polyglycolic acid, polylactic acid, polydioxanan, polycaprolactone, copolymer of lactic acid and glycolic acid, copolymer of lactic acid and caprolactone, copolymer of glycolic acid and caprolactone, and polyhydroxybutylate; and
    said free radical scavenger is at least one selected from the group consisting of: polyphenols, tannic acids, gallic acids, vitamin E, and triarylisocianulate.

9. The method for producing a biodegradable polymer product according to claim 8, wherein said free radical scavenger is present in an amount from 0.01 to 10 wt. % by volume per 100 wt. % of polymer.

10. The method for producing a biodegradable polymer product according to claim 8, wherein said free radical scavenger is present in an amount from 0.01 to 2 wt. % by volume per 100 wt. % of polymer.

11. The method for producing a biodegradable polymer product according to claim 8, wherein said biodegradable polymer composition is formed as a complex with an inorganic compound.

12. The method for producing a biodegradable polymer product according to claim 11, wherein said inorganic compound is selected from the group consisting of: apatite, zeolite, and titanium oxide.

13. The method for producing a biodegradable polymer product according to claim 8, wherein said mixture is molded at a temperature not more than 50 degrees Centigrade higher than a melting temperature of said biodegradable polymer.

14. The method for producing a biodegradable polymer product according to claim 8, wherein said mixture is sterilized with radioactive rays with an intensity of 1.0 to 3.0 Mrad.

15. The method for producing a biodegradable polymer product according to claim 8, further comprising sterilizing said product with radioactive rays with an intensity of 1.0 to 3.0 Mrad.

16. The method for producing a biodegradable polymer product according to claim 8, wherein an average molecular weight of said polymer is about 280,000 to 340,000.

17. The method for producing a biodegradable polymer product according to claim 8, wherein said molding said mixture by a method involving a melt of the mixture is a method selected from the group consisting of: extrusion molding, injection molding, and press molding.

18. The method for producing a biodegradable polymer product according to claim 8, wherein said product is a surgical suture.

19. A biodegradable polymer product produced by molding a melt of a mixture comprising a biodegradable polymer and a free radical scavenger,
    wherein said biodegradable polymer is at least one selected from the group consisting of: polyglycolic acid, polylactic acid, polydioxanan, polycaprolactone, copolymer of lactic acid and glycolic acid, copolymer of lactic acid and caprolactone, copolymer of glycolic acid and caprolactone, and polyhydroxybutylate; and
    said free radical scavenger is at least one selected from the group consisting of: polyphenols, tannic acids, gallic acids, vitamin E, and triarylisocianulate.

20. The biodegradable polymer product according to claim 19, wherein said free radical scavenger is present in an amount from 0.01 to 10 wt. % of said polymer.

21. The biodegradable polymer product according to claim 19, wherein an average molecular weight of said polymer is 260,000 to 330,000.

22. The biodegradable polymer product according to claim 19, which is a surgical suture.

* * * * *